(12) United States Patent
Penkert

(10) Patent No.: US 7,313,991 B2
(45) Date of Patent: Jan. 1, 2008

(54) CUTTING INSERT AND USE THEREOF

(75) Inventor: Werner Penkert, Schwanstetten (DE)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/789,927

(22) Filed: Feb. 27, 2004

(65) Prior Publication Data
US 2004/0258491 A1 Dec. 23, 2004

Related U.S. Application Data

(63) Continuation-in-part of application No. PCT/IB02/03374, filed on Aug. 21, 2002.

(30) Foreign Application Priority Data
Aug. 28, 2001 (DE) .................. 101 42 049

(51) Int. Cl.
B23B 27/18 (2006.01)
(52) U.S. Cl. ................. 82/1.11; 407/118; 407/113
(58) Field of Classification Search ............ 407/113, 407/118, 119, 107, 109, 111; 82/1.11; 428/698, 428/427, 307, 51, 309; B23B 27/18
See application file for complete search history.

(56) References Cited

U.S. PATENT DOCUMENTS

| | | | |
|---|---|---|---|
| 3,369,283 A | 2/1968 | Colding | |
| 3,705,447 A | 12/1972 | Kollar | |
| 4,201,501 A | 5/1980 | Day | |
| 4,552,491 A * | 11/1985 | Parker | 407/107 |
| 4,632,606 A | 12/1986 | Lagerberg | |
| 4,714,385 A * | 12/1987 | Komanduri | 407/119 |
| 5,104,747 A * | 4/1992 | Makino et al. | 428/621 |
| 5,205,680 A * | 4/1993 | Lindstedt | 407/116 |
| 5,712,030 A | 1/1998 | Goto et al. | |
| 5,733,073 A | 3/1998 | Zitzlaff et al. | |
| 5,868,530 A * | 2/1999 | Shouse | 407/101 |
| 5,921,721 A * | 7/1999 | Hintze et al. | 407/113 |
| 6,217,263 B1 * | 4/2001 | Wiman et al. | 407/114 |
| 6,379,087 B1 * | 4/2002 | Alexander, IV | 407/107 |
| 6,715,968 B1 | 4/2004 | Tägtström et al. | |

(Continued)

FOREIGN PATENT DOCUMENTS

CN 85100128 A 8/1986

(Continued)

OTHER PUBLICATIONS

Sandvik Coromant: "Metalworking products turning tool catalogue 2000" 2000, Sandvik Coromant, Halesowen, England XP002219093, Catalogue Code C-1000:7-ENG, Refer to Data for N151.2-8000-60 F-P Insert, p. B22.

(Continued)

Primary Examiner—Monica Carter
Assistant Examiner—Sara Addisu
(74) Attorney, Agent, or Firm—Nils H. Ljungman & Associates

(57) ABSTRACT

A cutting insert made of cemented carbide and the use thereof for recessing or copy-turning, preferably at a high rotating speed. The cutting insert has at least one recess for insertion therein of a cutting body of a material other than cemented carbide, such as a ceramic material.

1 Claim, 1 Drawing Sheet

U.S. PATENT DOCUMENTS 6,969,218 B2 * 11/2005 Lach et al. .................. 407/5
2002/0131832 A1 * 9/2002 Morsch ..................... 407/118

FOREIGN PATENT DOCUMENTS

| CN | 87103163 A | 11/1988 |
| CN | 87205995 U | 12/1988 |
| DE | 42 44 316 A1 | 6/1994 |
| DE | 43 02 645 A1 | 8/1994 |
| DE | 198 44 858 C1 | 9/1998 |
| DE | 69520195 T2 | 8/2001 |
| DE | 69915315 T2 | 7/2004 |
| EP | 0 552 714 A1 | 7/1993 |
| EP | 0 431 009 B1 | 5/1994 |
| EP | 0 940 215 A1 | 9/1999 |
| EP | 0940215 A1 | 9/1999 |
| EP | 1190795 A1 | 3/2002 |
| JP | 57027602 | 2/1982 |
| JP | 62099006 A * | 5/1987 |
| JP | 3079206 | 4/1991 |
| WO | WO 99/12680 | 3/1999 |
| WO | WO 99/30860 | 6/1999 |
| WO | WO 00/20149 | 4/2000 |

OTHER PUBLICATIONS

Kennametal Hertel: "Turning Tool Catalogue 2000" 2000, Kennametal Hertel, West Midlands, UK XP002219094, Catalogue Reference No. 501.00, p. 309.

Ashby MF & Jones DRH: Engineering Materials an Introduction to Their Properties and Applications: 1980, Pergamon Press, Oxford, England XP002219095, ISBN 0-08-026138-8, p. 3; Table 1.2, p. 188, Last Paragraph—p. 189, Line 20, p. 189; Table 20.4.

* cited by examiner

CUTTING INSERT AND USE THEREOF

This application is a Continuation-In-Part application of International Patent Application No. PCT/IB02/03374, filed on Aug. 21, 2002, which claims priority from Federal Republic of Germany Patent Application No. 101 42 049.8, filed on Aug. 28, 2001. International Patent Application No. PCT/IB02/03374 was pending as of the filing date of this application. The United States was an elected state in International Patent Application No. PCT/IB02/03374.

BACKGROUND

1. Technical Field

The present application relates to a cutting insert made of cemented carbide having at least one recess for insertion therein of a cutting body consisting of a cutting material different from cemented carbide to form a firm connection, the cutting body having formed a cutting edge thereon.

2. Background Information

Cutting inserts of this type are known from U.S. Pat. Nos. 3,369,283 and 4,201,501 and from EP-B1-0 431 009, for example.

These prior cutting inserts consist of a cemented carbide based on tungsten carbide, the binder metal for the hard component being cobalt, nickel and/or iron in most cases, and the cutting body inserted in a recess of the cutting insert is made of a polycrystalline material, such as, e.g. diamond or cubic boron nitride. The polycrystalline material is bonded into the recess of the cutting insert with the aid of a suitable adhesive or is brazed into it. Suitable adhesives and brazing materials are commercially available.

In addition, cutting inserts have long been known which are made either of cemented carbide only or of a ceramic cutting material only.

While ceramic cutting inserts are basically more suitably used for high-temperature applications, i.e. for metal cutting of workpieces in the high-speed range, than cemented carbide cutting inserts, the lower transverse rupture strength of the ceramic cutting inserts becomes noticeable increasingly more negatively as the dimensions of the cutting inserts become smaller. For this reason it had so far not been possible to manufacture tools from a high-temperature resistant ceramic material which have a very small cutoff width or a very small radius for copy-turning in the high-speed range. On the other hand, it had so far not been possible to manufacture useful indexable inserts made of solid cemented carbide and having very small dimensions and simultaneously highly complex shapes.

OBJECT OR OBJECTS

Accordingly, one possible object of the present invention is to provide cutting inserts which are particularly suitable for high-speed metal cutting operations, that is, are especially heat-resistant, while nonetheless exhibiting a very high mechanical strength, so that even very small cutting bodies having a very small cutoff width or a very small radius can be manufactured which have a sufficient tool life.

SUMMARY

This object is achieved in accordance with one possible embodiment in a cutting insert of the kind mentioned at the outset in that the cutting body consists of a ceramic cutting material and has a geometric shape, at least a portion of which is congruent with the geometric shape of the recess.

In the cutting insert in accordance with one possible embodiment, the high-temperature characteristics of a ceramic cutting body are combined with the advantages of a carrier of solid cemented carbide. The special mutual matching of the geometric shape of the ceramic cutting body, which is configured in the nature of a male mold, and the geometric shape of the recess in the cemented carbide insert, formed in the nature of a female mold adapted thereto, results in a high mechanical stiffness of the composite structure formed of the two bodies, which has an advantageous effect in particular in high-speed machining of workpieces associated with high and extremely high temperatures.

In a particularly preferred embodiment of the cutting insert, the ceramic cutting body has the shape of a circular truncated cone, preferably a perpendicular circular truncated cone. This shape results in an especially stable conical seat of the ceramic cutting body in the cemented carbide cutting insert and therefore an optimum support and connection of the two bodies consisting of different materials.

Preferably, the ceramic cutting body has a smaller base surface which is attached to the bottom of the recess, while the cutting edge is formed at the exposed circular arc of the larger base surface of the circular truncated cone and extends in the shape of a partial circle. This design results in an optimum ratio between rake faces and flank faces and, hence, an excellent suitability of the cutting insert for the manufacture of indexable inserts which have many uses and are in particular suitable for tools having a very small cutoff width or a very small radius.

The cutting edge preferably comprises a partial circle of at least 200°, but of not more than 230°. If the partial circle on which the cutting edge lies circumscribes less than 200°, the effective overall length of the cutting edge is too short for general purpose employment, whereas if the partial circle circumscribes more than 230°, the remaining residual surface of the lateral area of the truncated cone serving for the mechanical connection and attachment of the two bodies is too small to ensure a sufficient mechanical strength of the composite structure.

The cone angle for the circular truncated cone is preferably selected such that the clearance angle (a) below the cutting edge is less than 10° and, particularly preferably, about 7±2°.

The cutting body is preferably bonded or brazed into the recess. Suitable adhesives on the basis of epoxy resin or acrylic resin or other high-temperature resistant adhesives are known and familiar to those of ordinary skill in the art. One example of a suitable adhesive is LOCTITE 601 manufactured by the Henkel Loctite Corporation, 1001 Trout Brook Crossing, Rocky Hill, Conn. 06067, USA.

In a preferred embodiment of the cutting insert, at least one groove extending transversely to the longitudinal axis of the cutting insert is provided for fastening the cutting insert to a conventional toolholder. In order to attain a substantially immovable, geometrically precisely definable seating of the cutting insert in a toolholder provided therefor, it is advantageous if the at least one groove is defined on either side by raised portions extending parallel to the groove, so as to allow a positive engagement with the fastening means provided therefor of the toolholder.

In one embodiment, the cutting insert is preferably configured as an indexable insert, such indexable insert having, in a particularly preferred embodiment, two to four cutting bodies.

In a particularly advantageous embodiment the maximum diameter of the cutting body amounts to from about 4±0.05 mm to about 10±0.05 mm, the material size or thickness of the ceramic cutting body being able to be reduced to values of about 2 mm without falling below the minimum requirements in regard to mechanical strength and stiffness. The thickness of the ceramic cutting body preferably corresponds to about half of the thickness of the cutting insert, without taking into account the raised portions surrounding the fastening groove.

The cutting insert is used to particular advantage for recessing or copy-turning, particularly at high rotating speeds and/or high-temperature applications, and particularly in cutting inserts having a very small cutoff width or a very small radius. The cutting insert according to one embodiment is especially suitable for recessing or copy-turning of light alloy workpieces, in particular of workpieces made of aluminum or aluminum alloys, as are found, for instance, in the automotive sector in the case of light alloy rims and other parts.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One possible embodiment will now be explained in greater detail below with reference to the drawings in which.

DESCRIPTION OF EMBODIMENT OR EMBODIMENTS

Figure 1:
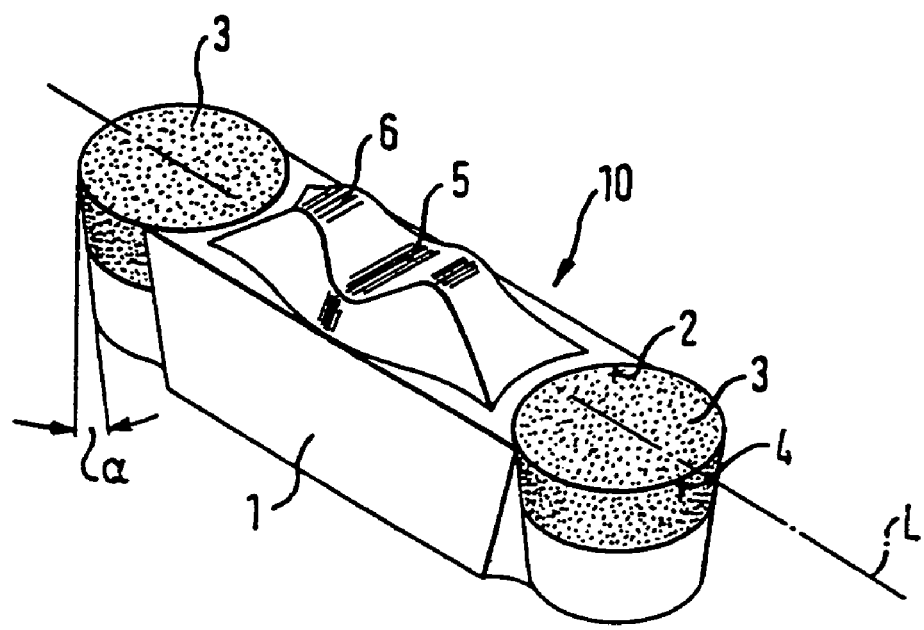
FIG. 1 is a perspective view of an embodiment of a cutting insert.

The cutting insert 10 comprises a base body 1 made of cemented carbide (cobalt-bound tungsten carbide), the cutting insert being designed as an indexable insert having a pair of ceramic cutting bodies 3.

The two ceramic cutting bodies 3 have the shape of a perpendicular circular truncated cone and are bonded into preformed recesses 2 of the base body 1 by means of a high-temperature adhesive in such a way that the smaller base surface of the circular truncated cone is bonded firmly to the bottom 7 of the recess and a part of the conical shell surface of the circular truncated cone to the conical wall surface congruent therewith of the recess 2. A cutting edge 4 is formed on the exposed circular arc of the larger base surface of the circular truncated cone of each of the two ceramic cutting bodies 3. The exposed partial circle, i.e., not extending within the recess 2, of the larger base surface of the circular truncated cone comprises at least 200°, but not more than 230° (each as related to the 360° of a full circle).

In the embodiment drawn the clearance angle a below the cutting edges 4 amounts to 7°.

A groove 5 extends transversely to the longitudinal axis L of the cutting insert 10 for fastening the cutting insert to a toolholder known per se. The groove 5 is defined on either side by raised portions 6 extending parallel to the groove, resulting in a cross-sectional profile sometimes referred to as "dogbone". The groove 5 is engaged by a complementarily formed claw of a toolholder (not shown) when the cutting insert is used as intended.

The maximum diameter of the larger base surface of the circular truncated cone of the ceramic cutting bodies 3 preferably amounts to 4, 6 or 8 mm, with a standard deviation of ±0.05 mm, and the material thicknesses of the ceramic cutting bodies 3 preferably amounts to 2.5 mm.

It is obvious to those skilled in the art that the cutting insert according to one embodiment can also comprise ceramic cutting bodies having a geometry other than that of a circular truncated cone, such as, e.g., having a cubic, cuboid, rhombohedral or other parallelepipedal shape.

Figure 2:
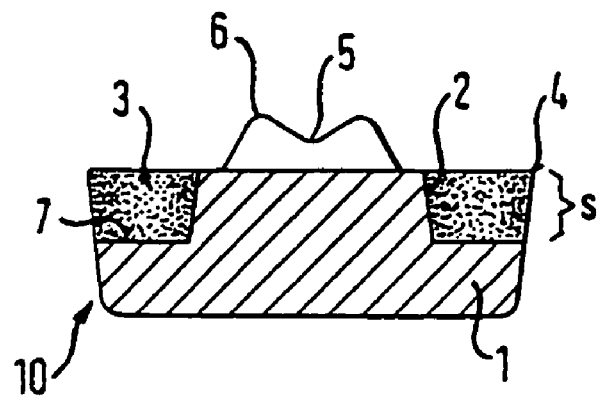
FIG. 2 is a partially sectioned side view (not to scale) of the cutting insert according to FIG. 1.

A particularly preferred embodiment is the cutting insert having a "dogbone"-configuration as shown in FIGS. 1 and 2 of the attached drawings. This embodiment shows, in combination, the following features:

a cutting insert made of cemented carbide having at least one recess for insertion therein of a cutting body consisting of a cutting material different from cemented carbide to form a firm connection, the cutting body having formed a cutting edge thereon, the cutting body consisting of a ceramic cutting material and having the shape of a circular truncated cone, at least a portion of which being congruent with the geometric shape of the recess, at least one groove defined on either side by raised portions extending parallel to said groove, and said groove extending transversely to a longitudinal axis of the cutting insert for fastening the cutting insert to a toolholder.

The advantages of the preferred embodiments will become most apparent, in terms of transverse rupture strength, if the maximum diameter of the cutting body is as small as from 4 to 10±0.05 mm.

One feature or aspect of an embodiment is believed at the time of the filing of this patent application to possibly reside broadly in a cutting insert made of cemented carbide having at least one recess for insertion therein of a cutting body consisting of a cutting material different from cemented carbide to form a firm connection, the cutting body having formed a cutting edge thereon, characterized in that the cutting body consists of a ceramic cutting material and has a geometric shape at least a portion of which is congruent with the geometric shape of the recess.

Another feature or aspect of an embodiment is believed at the time of the filing of this patent application to possibly reside broadly in the cutting insert, characterized in that the ceramic cutting body has the shape of a circular truncated cone.

Yet another feature or aspect of an embodiment is believed at the time of the filing of this patent application to possibly reside broadly in the cutting insert, characterized in that the ceramic cutting body has a smaller base surface which is attached to the bottom of the recess and that the cutting edge is formed at the exposed circular arc of the larger base surface of the circular truncated cone and extends in the shape of a partial circle.

Still another feature or aspect of an embodiment is believed at the time of the filing of this patent application to possibly reside broadly in the cutting insert, characterized in that the circular truncated cone is a perpendicular circular truncated cone.

A further feature or aspect of an embodiment is believed at the time of the filing of this patent application to possibly reside broadly in the cutting insert, characterized in that the cutting edge comprises a partial circle of at least 200°.

Another feature or aspect of an embodiment is believed at the time of the filing of this patent application to possibly reside broadly in the cutting insert, characterized in that the cutting edge comprises a partial circle of not more than 230°.

Yet another feature or aspect of an embodiment is believed at the time of the filing of this patent application to possibly reside broadly in the cutting insert, characterized by a clearance angle of <10°.

Still another feature or aspect of an embodiment is believed at the time of the filing of this patent application to possibly reside broadly in the cutting insert, characterized by a clearance angle of 7±2°.

A further feature or aspect of an embodiment is believed at the time of the filing of this patent application to possibly reside broadly in the cutting insert, characterized in that the cutting body is bonded or brazed into the recess.

Another feature or aspect of an embodiment is believed at the time of the filing of this patent application to possibly reside broadly in the cutting insert, characterized by at least one groove extending transversely to the longitudinal axis of the cutting insert for fastening the cutting insert to a toolholder.

Yet another feature or aspect of an embodiment is believed at the time of the filing of this patent application to possibly reside broadly in the cutting insert, characterized in that the at least one groove is defined on either side by raised portions extending parallel to the groove.

Another feature or aspect of an embodiment is believed at the time of the filing of this patent application to possibly reside broadly in the cutting insert, characterized in that it is configured as an indexable insert.

Yet another feature or aspect of an embodiment is believed at the time of the filing of this patent application to possibly reside broadly in the cutting insert, characterized in that the indexable insert is fitted with two to four cutting bodies.

Still another feature or aspect of an embodiment is believed at the time of the filing of this patent application to possibly reside broadly in the cutting insert, characterized in that the maximum diameter of the cutting body amounts to 4±0.05 mm to 10±0.05 mm.

A further feature or aspect of an embodiment is believed at the time of the filing of this patent application to possibly reside broadly in a use of the cutting insert for recessing or copy-turning, in particular at a high rotating speed.

Another feature or aspect of an embodiment is believed at the time of the filing of this patent application to possibly reside broadly in a use of the cutting insert for recessing or copy-turning of light alloy workpieces, in particular of workpieces made of aluminum or aluminum alloys.

The components disclosed in the various publications, disclosed or incorporated by reference herein, may possibly be used in possible embodiments of the present invention, as well as equivalents thereof.

One embodiment relates to a cutting insert made of cemented carbide and to the use thereof for recessing or copy-turning, preferably at a high rotating speed. The cutting insert has at least one recess for insertion therein of a cutting body consisting of a cutting material different from cemented carbide to form a firm connection, the cutting body having formed a cutting edge thereon. To allow employment of the cutting insert of a high mechanical strength even with small dimensions in the high-temperature range, it is proposed that the cutting body consist of a ceramic cutting material and have a geometric shape at least a portion of which is congruent with the geometric shape of the recess. Preferably, the ceramic cutting body has the shape of a circular truncated cone.

The following U.S. Pat. Nos. regarding drills and/or drill inserts are hereby incorporated by reference as if set forth in their entirety herein: U.S. Pat. No. 5,800,100, issued to Krenzer on Sep. 1, 1998; NHL-KEH-06, issued to Kammermeier on Nov. 3, 1998; U.S. Pat. No. 5,967,710, issued to Krenzer on Oct. 9, 1999; U.S. Pat. No. 6,045,301, issued to Kammermeier et al. on Apr. 4, 2000; U.S. Pat. No. 6,116,825, issued to Kammermeier et al. on Sep. 12, 2000; U.S. Pat. No. 6,164,879, issued to Krenzer on Dec. 26, 2000; U.S. Pat. No. 6,210,083, issued to Kammermeier et al. on Apr. 3, 2001; U.S. Pat. No. 6,231,276, issued to Müller et al. on May 15, 2001; U.S. Pat. No. 5,904,455, issued to inventors Krenzer et al. on May 18, 1999; U.S. Pat. No. 6,309,149, issued to inventor BORSCHERT on Oct. 30, 2001; U.S. Pat. No. 6,374,712, issued to inventors Gebhard MÜLLER et al. on Apr. 23, 2002; U.S. Pat. No. 6,688,817, issued to inventors BORSCHERT, et al. on Feb. 10, 2004; U.S. Pat. No. 6,655,882, issued to inventors HEINRICH et al. on Dec. 2, 2003; and U.S. Pat. No. 6,676,339, issued to inventor HARTLOHNER on Jan. 13, 2004.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The publication "Lathe Catalog 1010," produced and published by Kennametal, Inc., Latrobe, Pa., U.S.A., is hereby incorporated by reference as if set forth in its entirety herein.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of high temperature adhesives that may possibly be utilized or adapted for use in at least one possible embodiment may possibly be found in the following U.S. Pat. No. 6,624,213, entitled "High temperature epoxy adhesive films"; U.S. Pat. No. 6,307,008, entitled "Polyimide for high temperature adhesive"; U.S. Pat. No. 5,385,990, entitled "Structural adhesive composition having high temperature resistance"; U.S. Pat. No. 5,242,755, entitled "High temperature adhesive"; U.S. Pat. No. 4,980,404, entitled "Adhesives for adhesive bonds having increased high-temperature strength"; U.S. Pat. No. 4,959,440, entitled "Polymide for high-temperature adhesive"; U.S. Pat. No. 4,734,482, entitled "Polyimide from ether diamine having the indane structure and high-temperature adhesive of polyimide"; U.S. Pat. No. 4,644,040, entitled "High temperature stable acrylic adhesive compositions employing aromatic polyimide and polyisoimide bis-acetylene additives"; U.S. Pat. No. 4,532,270, entitled "High temperature stable adhesive compositions employing aromatic polyimide and polyisoimide bis-acetylene additives"; U.S. Pat. No. 4,518,735, entitled "High temperature stable adhesive for semiconductor device packages, low-cost semiconductor device package and process"; U.S. Pat. No. 4,432,848, entitled "Radiation cured, high temperature pressure-sensitive adhesive"; U.S. Pat. No. 4,418,166, entitled "High temperature resistant adhesive bonding composition of epoxy resin and two-part hardener"; U.S. Pat. No. 4,233,103, entitled "High temperature-resistant conductive adhesive and method employing same"; U.S. Pat. No. 4,151,057, entitled "High temperature adhesive made by exposure to radiation"; and U.S. Pat. No. 4,133,731, entitled "Radiation cured, high temperature adhesive composition."

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Oct. 31, 2002, and/or cited elsewhere are hereby incorporated by reference as if set forth in their entirety herein as follows: JP 03 079206 A (abstract); JP 57 027602 A (abstract); WO 00 20149 A; U.S. Pat. No. 4,632,606 A; Sandvik Coromant: "Metalworking Products Turning Tool Catalogue 2000"; Kennametal Hertel: "Turning Tool Catalogue 2000"; Ashby MF & Jones DRH: "Engineering Materials An Introduction to their Properties and Applications"; DE 198 44 858 C; EP 0 552 714 A; WO 99 12680 A; U.S. Pat. No. 3,705,447 A; U.S. Pat. No. 5,733,073A; and EP 0 431 009 B.

The corresponding foreign and international patent publication applications, namely, Federal Republic of Germany Patent Application No. 101 42 049.8, filed on Aug. 28, 2001, having inventor Werner PENKERT, and DE-OS 101 42 049.8 and DE-PS 101 42 049.8, and International Application No. PCT/IB02/03374, filed on Aug. 21, 2002, having WIPO Publication No. WO03/018241 and inventor Werner PENKERT, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

Some examples of brazing methods and brazing materials that may possibly be utilized or adapted for use in at least one possible embodiment may possibly be found in the following U.S. Pat. No. 6,663,982, entitled "Silver-hafnium braze alloy"; U.S. Pat. No. 6,528,123, entitled "Coating system to permit direct brazing of ceramics"; U.S. Pat. No. 6,427,900, entitled "Active brazing solder for brazing alumina-ceramic parts"; U.S. Pat. No. 6,315,188, entitled "Surface preparation for high purity alumina ceramics enabling direct brazing in hydrogen atmospheres"; U.S. Pat. No. 6,247,565, entitled "Composition and process for the reactive brazing of ceramic materials containing alumina"; U.S. Pat. No. 6,221,499, entitled "Method using a thick joint for joining parts in SiC-based materials by refractory brazing and refractory thick joint thus obtained"; U.S. Pat. No. 6,054,693, entitled "Microwave technique for brazing materials"; U.S. Pat. No. 6,050,478, entitled "Composition and process for the reactive brazing of ceramic materials containing alumina"; U.S. Pat. No. 6,039,918, entitled "Active brazing solder for brazing alumina-ceramic parts"; U.S. Pat. No. 5,975,407, entitled "Method using a thick joint for joining parts in SiC-based materials by refractory brazing and refractory thick joint thus obtained"; U.S. Pat. No. 5,922,479, entitled "Brazing alloy and composite assembly joined by using the same"; U.S. Pat. No. 5,836,505, entitled "Joining by brazing of ceramic materials containing silicon carbide"; RE35,521, entitled "Brazing alloy of copper, silicon, titanium, aluminum"; U.S. Pat. No. 5,431,331, entitled "Thermal resilient multiple jaw braze fixture"; U.S. Pat. No. 5,407,119, entitled "Laser brazing for ceramic-to-metal joining"; U.S. Pat. No. 5,340,012, entitled "Titanium hydride coated brazing product"; U.S. Pat. No. 5,334,344, entitled "Ternary active brazing based on a zirconium-nickel alloy"; U.S. Pat. No. 5,186,380, entitled "Titanium hydride coated brazing product"; U.S. Pat. No. 5,087,416, entitled "Brazing alloy of copper, silicon, titanium, aluminum"; U.S. Pat. No. 4,902,358, entitled "Ceramic to metal brazing"; U.S. Pat. No. 4,901,904, entitled "Method of producing brazing metals"; U.S. Pat. No. 4,883,218, entitled "Method of brazing a ceramic article to a metal article"; U.S. Pat. No. 4,735,866, entitled "Copper-silver-titanium-tin filler metal for direct brazing of structural ceramics"; U.S. Pat. No. 4,714,189, entitled "Brazing eutectic and method"; U.S. Pat. No. 4,698,271, entitled "Copper-silver-titanium filler metal for direct brazing of structural ceramics"; U.S. Pat. No. 4,690,876, entitled "Article comprising a ductile brazing alloy foil containing reactive metals and precious metals"; U.S. Pat. No. 4,679,960, entitled "Ceramic and metal brazed articles"; U.S. Pat. No. 4,678,636, entitled "Ductile brazing alloy containing reactive metals and precious metals"; U.S. Pat. No. 4,591,535, entitled "Method of brazing ceramics using active brazing alloys"; U.S. Pat. No. 4,471,026, entitled "Ternary alloys in brazing ceramics"; and U.S. Pat. No. 4,459,264, entitled "Reactive metal-palladium-silver brazing alloys."

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure."The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A cutting insert comprising:
a base body comprising cemented carbide;
at least one cutting body comprising ceramic material;
said at least one cutting body comprising a cutting edge to cut into metal; and
said at least one cutting body being joined to said base body:
said base body comprises at least one recess;
said at least one recess being configured to receive said at least one cutting body;
said at least one recess is substantially, congruently shaped with respect to at least a portion of said at least one ceramic cutting body;
said at least one ceramic cutting body is in the shape of a circular truncated cone;
said at least one ceramic cutting body has a first end surface and a second surface disposed at opposite ends of said truncated cone;
said first end surface is smaller in diameter than said second end surface;
said at least one recess comprises a bottom surface and a side surface disposed substantially transverse to said bottom surface;
said first end surface is attached to said bottom surface of said at least one recess;
said second end surface comprises a cutting edge formed at the exposed circular perimeter edge of said second end surface of the circular truncated cone and extends in the shape of a partial circle;
said cutting edge comprises a partial circle of at least 200° and not more than 230°;
said cutting insert defines a clearance angle of one of (A) and (B):
(A) <10°; and
(B) 7 ±2°;
said at least one cutting body is bonded or brazed into said at least one recess;
said base body comprises at least one groove extending transversely to the longitudinal axis of said cutting insert for fastening said cutting insert to a toolholder;
said at least one groove is defined on either side by raised portions extending substantially parallel to said at least one groove;
said cutting insert is configured as an indexable insert;
said indexable cutting insert is fitted with two, three, or four cutting bodies; and
the maximum diameter of said at least one cutting body is in the range of 4±0.05 mm to 10±0.05 mm.

* * * * *